(12) United States Patent
Schwalb et al.

(10) Patent No.: US 9,870,615 B2
(45) Date of Patent: Jan. 16, 2018

(54) MORPHOLOGY IDENTIFICATION IN TISSUE SAMPLES BASED ON COMPARISON TO NAMED FEATURE VECTORS

(71) Applicant: Schwalb Consulting, LLC, Irvine, CA (US)

(72) Inventors: Edward M Schwalb, Irvine, CA (US); Tammy April Schwalb, Irvine, CA (US)

(*) Notice: Subject to any disclaimer, the term of this patent is extended or adjusted under 35 U.S.C. 154(b) by 0 days.

(21) Appl. No.: 15/653,579

(22) Filed: Jul. 19, 2017

(65) Prior Publication Data

US 2017/0323445 A1 Nov. 9, 2017

(51) Int. Cl.
*G06K 9/00* (2006.01)
*G06T 7/00* (2017.01)
(Continued)

(52) U.S. Cl.
CPC ........ *G06T 7/0014* (2013.01); *G06K 9/00134* (2013.01); *G06K 9/00147* (2013.01);
(Continued)

(58) Field of Classification Search
USPC ........ 382/100, 103, 106–107, 128–134, 154, 382/162, 168, 173, 181, 194, 219, 224, 382/232, 254–260, 274–276, 286–291, 382/305, 312; 703/11; 348/239; 378/4, 378/43
See application file for complete search history.

(56) References Cited

U.S. PATENT DOCUMENTS 6,993,169 B2 1/2006 Wetzel et al.
7,181,056 B2 2/2007 Campanini et al.
(Continued)

FOREIGN PATENT DOCUMENTS

CA 2842377 A1 1/2013
WO WO/2016/154116 A1 9/2016

OTHER PUBLICATIONS

Scott Doyle, et al., Automated Grading of Breast Cancer Histopathology Using Spectral Clustering With Textural and Architectural Image Features, Conference May 14-17, 2008, Publisher IEEE, Paris, France, 4 pages.
(Continued)

*Primary Examiner* — Seyed Azarian
(74) *Attorney, Agent, or Firm* — Michael Feigin; Feigin & Fridman LLC (57) ABSTRACT

Locating morphology in a tissue sample is achieved with devices and methods involving storage of a plurality of feature vectors, each associated with a specific named superpixel of a larger image of a tissue sample from a mammalian body. A microscope outputs, in some embodiments, a live image of an additional tissue sample or a digitized version of the output is used. At least one superpixel of the image is converted into a feature vector and a nearest match between the first feature vector and the plurality of stored feature vectors is made. A first name suggestion is then made based on the nearest match comparison to a store feature vector. Further, regions of interest within the image can be brought to a viewer's attention based on their past history of selection, or that of others.

20 Claims, 5 Drawing Sheets

(51) Int. Cl.
  *G06K 9/48* (2006.01)
  *G21K 7/00* (2006.01)
  *G06T 11/00* (2006.01)
  *G06K 9/20* (2006.01)

(52) U.S. Cl.
  CPC ........... *G06K 9/481* (2013.01); *G06K 9/2081* (2013.01); *G06T 11/001* (2013.01); *G06T 2207/10056* (2013.01); *G06T 2207/10141* (2013.01); *G06T 2207/30196* (2013.01)

(56) References Cited

U.S. PATENT DOCUMENTS

| | | |
|---|---|---|
| 7,876,938 B2 | 1/2011 | Huang et al. |
| 8,319,793 B2 | 11/2012 | Schaepe et al. |
| 8,488,863 B2 | 7/2013 | Boucheron |
| 9,430,829 B2 | 8/2016 | Madabhushi et al. |
| 9,478,022 B2 | 10/2016 | Kamen et al. |
| 2003/0103665 A1* | 6/2003 | Uppaluri ............... G06T 7/0012 382/131 |
| 2013/0226548 A1* | 8/2013 | Beck ...................... G06F 19/12 703/11 |
| 2014/0133702 A1* | 5/2014 | Zheng ................ G06K 9/00624 382/103 |
| 2014/0198236 A1* | 7/2014 | Herman ................. H04N 5/265 348/239 |
| 2016/0335478 A1* | 11/2016 | Bredno ............. G06K 9/00147 |
| 2017/0091937 A1* | 3/2017 | Barnes ................. G06T 7/0012 |

OTHER PUBLICATIONS

James Diamond, et al., The Use of Morphological Characteristics and Texture Analysis in the Identification of Tissue Composition in Prostatic Neoplasia, Oct. 2004, 11 pages.

Fayao Liu, et al., CRF Learning with CNN Features for Image Segmentation, School of Computer Science, Mar. 28, 2015, The University of Adelaide, Australia, 11 pages.

* cited by examiner

FIG. 4

MORPHOLOGY IDENTIFICATION IN TISSUE SAMPLES BASED ON COMPARISON TO NAMED FEATURE VECTORS

FIELD OF THE DISCLOSED TECHNOLOGY

The disclosed technology relates generally to processing histology slides, and more specifically to a method of learning and determining morphology or pathology exited on the slides.

BACKGROUND OF THE DISCLOSED TECHNOLOGY

Identification of morphology and/or pathologies is often carried out by taking tissue samples, cultures, or the like and viewing same under a microscope. Histology slides, such as Hematoxylin and Eosin slides (herein, "H&E") are viewed to determine a cause of illness or detect an illness, presence of a pathogen, or abnormality in a body of a human or other mammal. When viewing a slide, it is easy to miss an item of interest when one is not actively looking for the specific item of interest (such as a pathology) or the variation is slight or small. When viewing a slide covering a large area where one must "scroll" to view under a microscope, it is further easy to miss an important detail.

The prior art has made some attempts to automate the process, but automation comes with risk of false positives or making the system less efficient. Examples of can be seen in U.S. Pat. No. 8,488,863, U.S. Pat. No. 8,897,537, U.S. Pat. No. 8,934,718 and EP 3,140,778 A2, where regions of interest have to be manually identified. For example, the method described in U.S. Pat. No. 8,488,863 requires classification of each pixel of a slide which requires hours of processing per slide. Most importantly, it is not clear that individual pixels provide sufficient predictive power to identify a pattern which is highly predictive of a disease state.

The method described in U.S. Pat. No. 8,897,537 and U.S. Pat. No. 8,934,718 requires that one select region of a slide to be analyzed by an automated process, but such a method leaves intact a problem of human error or missed information. There is a low (almost no) concordance among human pathologists, as shown by Ezgi Mercan, Selim Aksoyy, Linda G. Shapiro, Donald L. Weaverx, Tad Brunye, Joann G. Elmorez, "Localization of Diagnostically Relevant Regions of Interest in WSI". Further, while it is mentioned that different analysis types may require different models, the disclosure of U.S. Pat. No. 8,897,537 it is unknown, based on the disclosure in this prior art reference, how it is possible for the system or a human to select the appropriate model to apply for each one of the tens of thousands of clinical contexts, e.g., ICD10 codes.

The method described EP 3,140,778 A2 requires that the image analysis is performed only after a region of interest has been identified. Further, it relies on predetermined thresholds to perform the analysis. The methods described in U.S. Pat. No. 8,319,793 rely on object networks to guide the pixel classifier so as to overcome the limited predictive value of individual pixels. The methods described in U.S. Pat. No. 8,319,793 relies on image preprocessing steps without which the effectiveness of the method degrades dramatically.

What is needed in the art is to identify histologies and regions of interest both accurately and quickly. It is desired to take the best that a human can do in making identifications and diagnoses when viewing a slide, as well as improve upon or augment same with the ability of a processor to suggest or recommend same.

SUMMARY OF THE DISCLOSED TECHNOLOGY

The disadvantages of the prior art are solved or lessened based on a method of helping to suggest or automatically identify morphologies in a tissue sample. This is carried out by way of receiving or obtaining multiple tissue samples from a mammal (e.g. human). These tissue samples are viewed in real time using a microscope, dried on a slide, and/or digitized into images. Then, based on receiving selections of superpixels (blocks of 30×30, 100×100, 200× 200 or another amount of pixels, such as a larger block in high resolution image), the superpixels are named based on their morphology. For purposes of this disclosure, morphology is defined as "taxonomic classification of a structure within an organism." The morphology can include modifications to a structure based on the existence of, or being a foreign object or pathogen. Thus, the morphology can include a pathology. Pathology, for purposes of this disclosure, is defined as "the structural and functional deviations from the normal that constitute disease or characterize a particular disease."

Once the superpixel has a named morphology, it is also associated with a feature vector. A feature vector is defined as "an n-dimensional vector of numerical features that represent a superpixel." The calculation of the feature vector from the superpixel can take place before or after the morphology is named. A library or database of feature vectors is created, each associated with a superpixel and named morphology (or pathology). Then, when another superpixel is extracted from an image (defined as, "read into memory" or "calculated into it's own feature vector"), a nearest match is found between a new feature vector created there-from and a feature vector in the database or library. A nearest match is then made between the new feature vector and one of the feature vectors in the library/database.

An indication is then made to a viewer that a superpixel may be associated with/representative of the named morphology which has already been associated with the feature vector which was determined to be the nearest match. A confirmation can then be received from the viewer that this extracted superpixel is, in fact, showing the same named morphology as previously named and the system, as a whole is said to "learn" more about the named morphology and provide better and better matches in the future. After, for a particular feature vector and nearest matches there-to, a name has been confirmed a threshold minimum number of times, this name becomes unchangeable or permanent. Thus, future scanned superpixels cannot be named otherwise, or at least, such a name for the morphology cannot be edited by viewers of the system. (Unchangeable is defined as requiring administrator privileges, in order to change the named morphology in the future, to the exclusion of the "viewer" or "views" who are carrying out some or all of the steps of the methods claimed in this technology.) However, before the threshold has been reached and a particular morphology/ feature vector set with the named morphology has not been named the threshold number of times, then the name can still be changed by viewers of the superpixels. The threshold number of times before a name of a morphology becomes locked can depend on how close the feature vectors of the named morphology are to each other, and/or can be a minimum number of 5, 8, 10, or 15 times a particular morphology has been named.

In some cases, it can be possible to find/extract multiple superpixels (either by way of automatic conversion of superpixels into feature vectors, or based on viewer selections of superpixels) which are converted into feature vectors which have not yet been named. For example, three different feature vectors can be created from three different superpixels which are from one, two, or three different tissue samples. These three feature vectors are found to be nearest matches to each other (by way of the transitive property or as compared to other feature vectors stored in the database which are further away there-from). The superpixels associated therewith one or more of these as yet unnamed morphologies can then be presented or exhibited and a name requested from a viewer. Once a name is provided for one of the feature vectors, the name is then applied to the other feature vectors found to be the nearest match there-to.

The above method, in whole or in part, and any or all of the steps described in the preceding four paragraphs can be carried out multiple times with a same viewer, each time with yet another tissue sample and/or yet another superpixel and corresponding feature vector. In the process, patterns of interest can be determined for a particular viewer based on one, two or all three of: a) areas of the images where the user zooms; b) areas of the image where the user pans; and/or c) areas of the images where the user names regions. So too, patterns of interest can be determined based on overlapping interest (any of "a", "b", or "c" or parts thereof) between two viewers such that what is a "pattern of interest" for the first viewer is considered as such for the second viewer.

Such "patterns of interest" between two users can also be determined as overlapping and presented to additional users based on an input that the two users are in the same medical specialty. A "medical specialty", for purposes of this disclosure, is defined as one of the specialties delineated by the Association of American Medical Colleges of Washington, D.C. as delineated at https://www.aamc.org/cim/specialty/exploreoptions/list/ as of June 2017 or as updated periodically. Once a pattern of interest is known, in another image of a tissue, suggestions of superpixels to view can be sent to the viewer(s) based on their interest. Thus, a carcinoma might be suggested to an oncologist and a bone fracture might be suggested to an orthopedic surgeon.

In some embodiments, a section of an image of a tissue sample with a high density of named morphologies is suggested for viewing. That is, the superpixels are each converted into feature vectors and those that are clustered or close together with the most named regions are brought to the attention of a viewer as a place to direct one's focus or attention. Such a suggestion can be made by zooming in a display of the tissue sample to the high density section, outlining the high density section, and or color coding the high density section.

When, in some embodiments, a plurality of named morphologies in a tissue sample are determined to be related to a clinical context, an indication that a particular type of medical specialty should be employed for a patient associated with the tissue sample is made. For example, a general practitioner viewing a tissue sample might be suggested to refer the patient to a breast cancer specialist when many named regions in a tissue sample are found to correspond to known type of breast cancer, based on the named morphologies of the associated nearest match feature vectors to the feature vectors created from the present tissue sample."

The above can be carried it on real-time (defined as "as fast as able to be processed by a processor and viewer carrying out steps disclosed herein") with a digitized view of a tissue sample, as seen by a microscope (a device which magnifies the size of images/received light reflected off a tissue sample). Superpixels of a live image are converted into a first feature vector, a nearest match between the first feature vector and a plurality of stored feature vectors is made, and output a first name suggestion of the at least one superpixel of the live image based on the nearest match to one of the stored plurality of feature vectors associated with said specific named superpixel is made. Then, a viewer can input confirmations of the name suggestion and the name can be locked in (unchangeable) after it is so named a threshold minimum number of times. Further, the pattern of interest features described above can also apply, alerting the viewer to stop moving and focus on a particular region (combination of superpixels) or particular superpixel.

Morphologies, or areas of greatest interest or greatest frequency which cover a largest part of an image, or at least a plurality of superpixels can be determined. A user is prompted or asked to name such morphologies of greatest frequency in some embodiments of the disclosed technology. In some embodiments, any unnamed region or section of image which has there-within more than one superpixel are sent to a user to be named, such as by highlighting or listing the regions to be named and as yet remain unnamed.

Any device or step to a method described in this disclosure can comprise or consist of that which it is a part of, or the parts which make up the device or step. The term "and/or" is inclusive of the items which it joins linguistically and each item by itself. "Substantially" is defined as "at least 95% of the term being described" and any device or aspect of a device or method described herein can be read as "comprising" or "consisting" thereof.

DETAILED DESCRIPTION OF EMBODIMENTS OF THE DISCLOSED TECHNOLOGY

Embodiments of the disclosed technology are described below, with reference to the figures provided.

Figure 1:
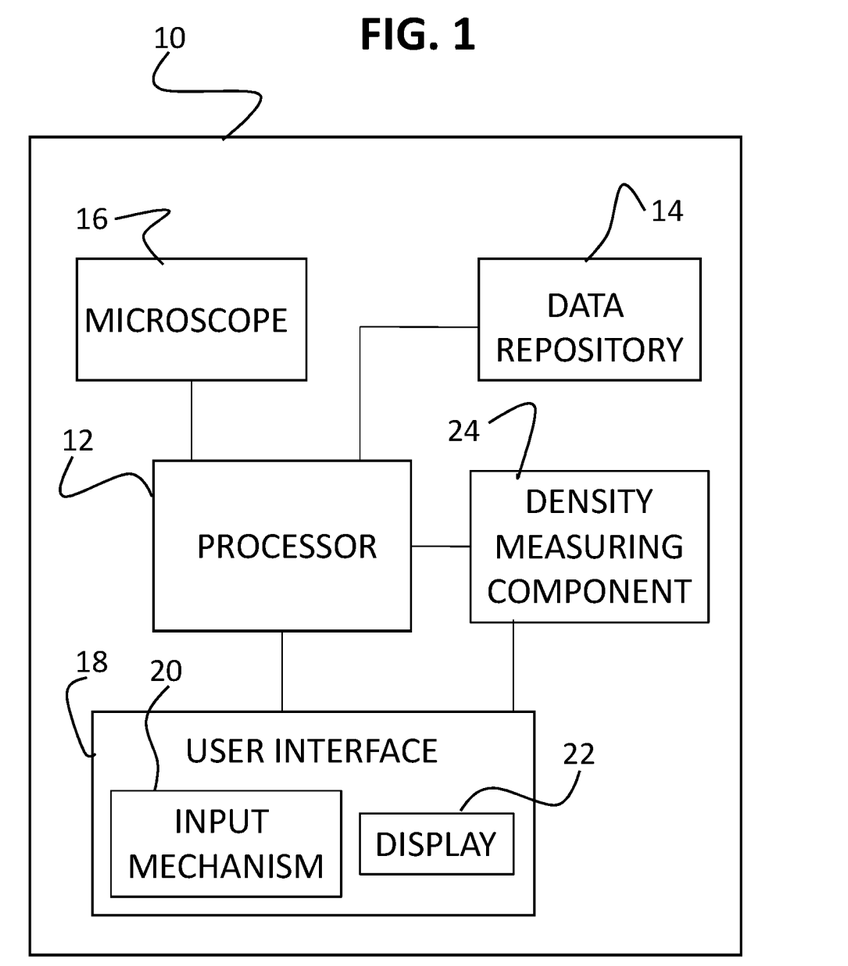
FIG. 1 shows a schematic block diagram of a system or a device for locating morphology in a tissue sample according to an embodiment of the disclosed technology.

FIG. 1 shows a schematic block diagram of a system or a device for locating morphology in a tissue sample according to an embodiment of the disclosed technology.

As seen in FIG. 1, a device 10 according to the disclosed technology includes a processor 12, adapted to carry out instructions as described in further detail hereinbelow. The device 10 may further include, or be associated with, a data repository 14, such as a database. The database includes superpixels, each taken from an image of a tissue sample taken from a mammalian body. Each of the superpixels in the database is associated with a corresponding feature vector, and at least some of the superpixels and associated feature vectors are labeled with a specific name, such as a name of a morphology or pathology imaged in the superpixel and/or represented by the feature vector.

In some embodiments, the data repository 14 is local to device 10, and is in direct communication with processor 12. In other embodiments, data repository 14 may be remote from processor 12, and may be functionally associated with the processor, or in communication therewith, via a network, such as a Local Area Network, for example local to a hospital or research facility, or a Wide Area Network, such as the Internet or another packet-switched network.

The processor 12 is further functionally associated with, or in communication with, an imaging device providing an image of a tissue sample, such as, for example, a microscope 16. In some embodiments, the image may be a live image, captured by microscope 16 from a suitable slide and delivered in real time to processor 12.

The processor 12 receives an image of a tissue sample, for example from microscope 16, and carried out instructions to convert at least one superpixel of the image into a feature vector representing features of the superpixel, to find a nearest match between the feature vector representing the superpixel and a feature vector stored in the data repository 14, and to output a name suggestion of the superpixel based on a name associated with the feature vector to which a nearest match was found. Further details relating to the functionality of processor 12 and actions carried out thereby are provided hereinbelow with respect to FIG. 2.

The device 10 may further include at least one user interface 18, including an input mechanism 20 via which a user, or a viewer, may provide input to processor 12. For example, the viewer may provide a confirmation of a name suggestion provided by the processor 12, as described in further detail hereinbelow with respect to FIG. 2, or may provide a name suggestion to be associated with a specific superpixel or feature vector, as described hereinbelow with respect to FIG. 3. In some embodiments, multiple users may provide input to processor 12, via multiple user interfaces 18 and multiple input mechanism 20. The user interface 18 may further include a display 22 for displaying information to a viewer, such as a suggested name for a specific superpixel.

In some embodiments, the device 10 further includes, or is associated with, a density measuring component 24 which measures a density of named morphologies in a captured image. In some such embodiments, the density measuring component 24 is functionally associated with display 22, such that relative densities of morphologies in part of an image may be presented to the user or viewer. In some embodiments, the density measuring component 24 may be a software thread running on processor 12, such as an image processing thread.

Reference is additionally made to FIG. 2, which shows a flow chart of a method for locating morphology in a tissue sample according to an embodiment of the disclosed technology, which method may be carried out using the device of FIG. 1.

Figure 2A:
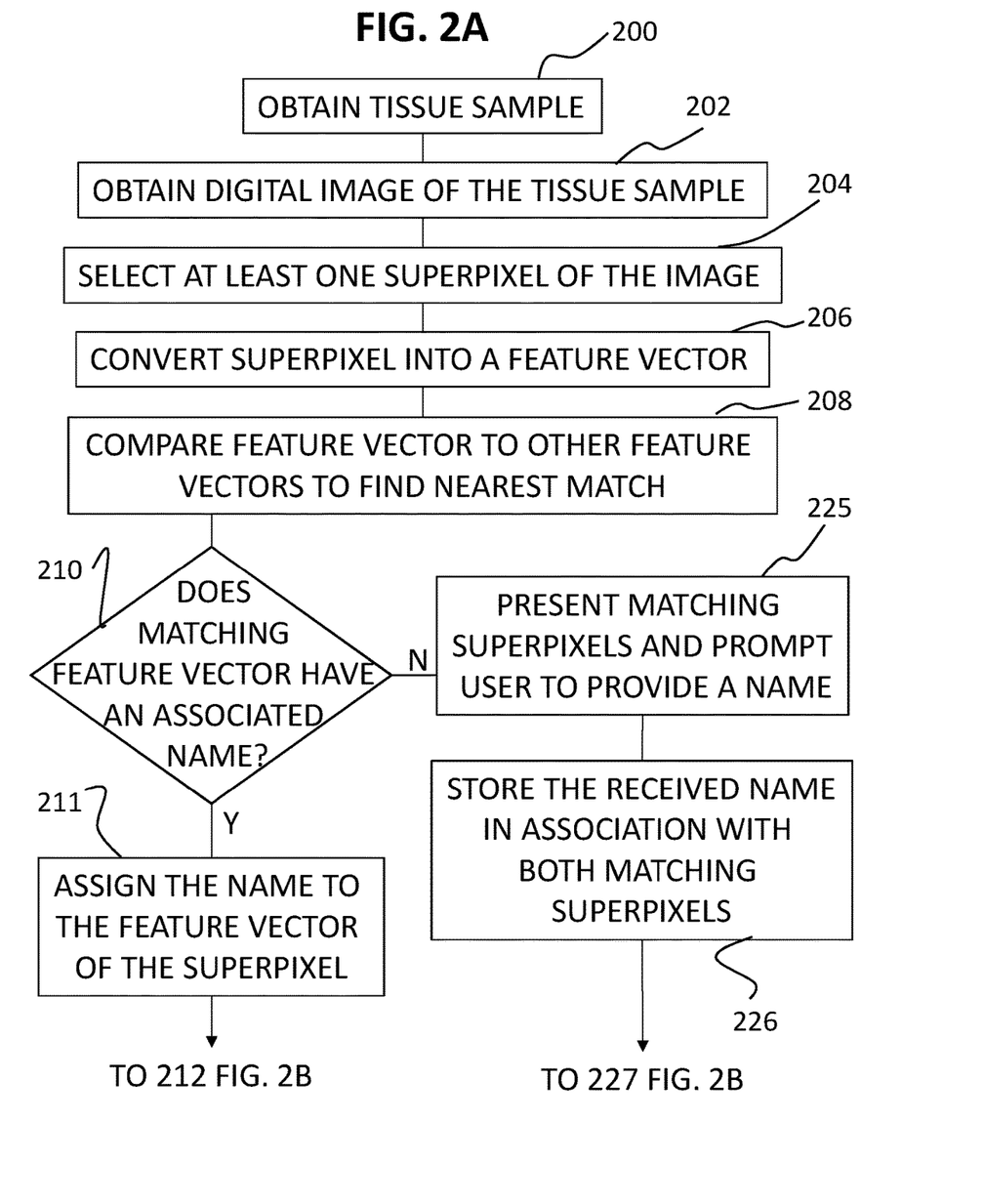
FIG. 2A shows a flow chart of a method for locating morphology in a tissue sample according to an embodiment of the disclosed technology, which method may be carried out using the device of FIG. 1.
Figure 2B:
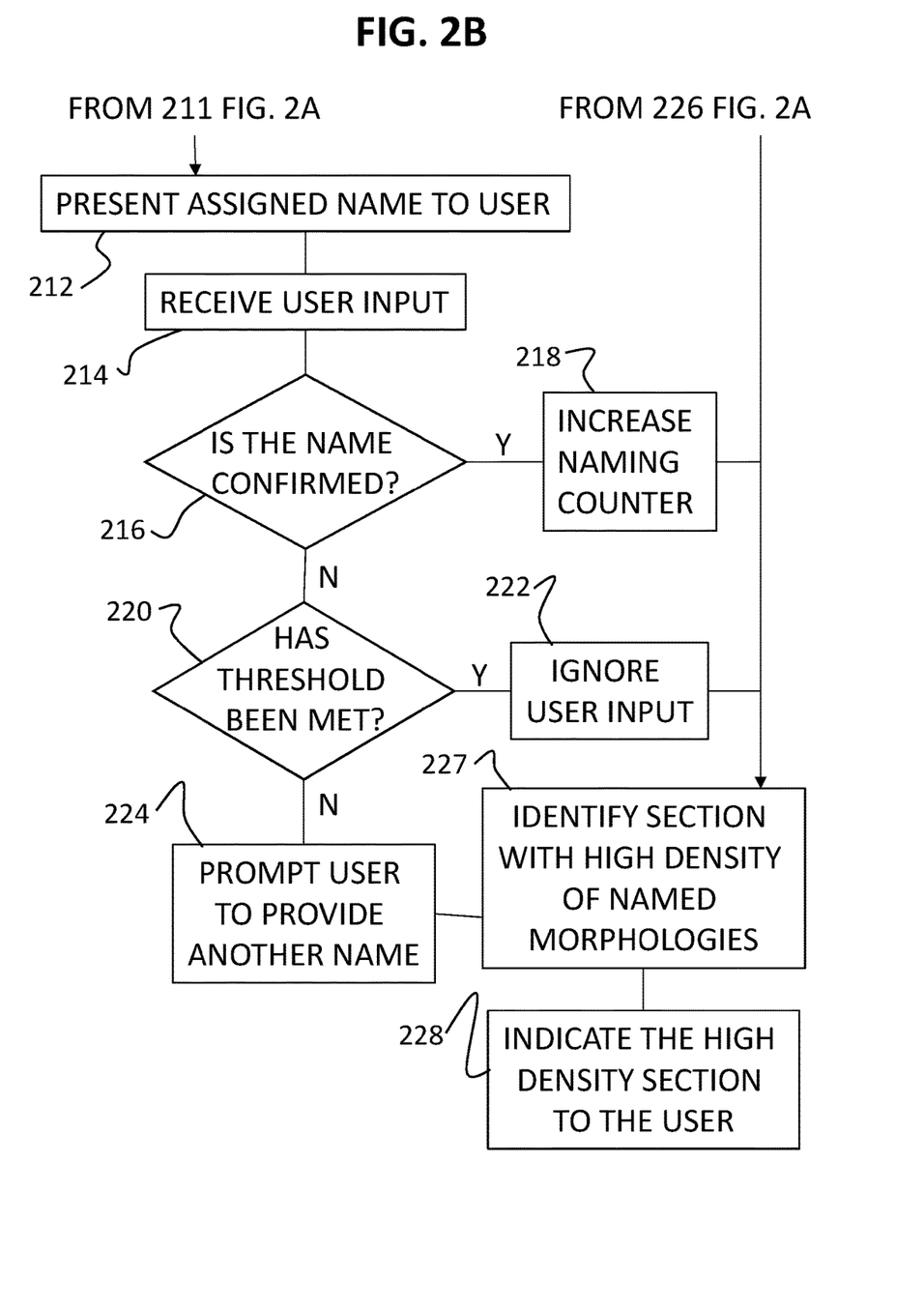
FIG. 2B is a continuation of FIG. 2A.

As seen in FIG. 2 (split into FIGS. 2A and 2B), initially a tissue sample is obtained from a mammalian body, at step 200. The tissue sample may be any suitable tissue sample, and may be obtained by any suitable means, such as during surgery, by a biopsy, and the like. A digital image of the tissue sample is obtained, or digitized, at step 202. This may be carried out using any suitable device, such as for example by microscope 16 (FIG. 1) or using any other suitable image capturing device.

At step 204, at least one superpixel of the digitized image is selected, for example by processor 12 (FIG. 1). The superpixel is then converted into a feature vector at step 206. The feature vector is a mathematical representation of features of the superpixel, such as to color distribution, intensity of color, height distribution, texture distribution, uniformity of color, and the like.

At step 208, the feature vector obtained in step 206 is compared to one or more other feature vectors associated with other superpixels, to find a specific other feature vector to which the feature vector has the nearest match, or is most similar. Each of the other feature vectors and/or other superpixels is further associated with a name, which typically represents a morphology or pathology of the tissue sample from whose image the other superpixel was obtained. In some embodiments, the other feature vector(s) may be previously obtained, and may be stored in a data repository, such as data repository 14 (FIG. 1). In other embodiments, the other feature vector is obtained from another sample, using a method similar to that described with respect to steps 202 to 206, and is named as described in further detail hereinbelow with respect to FIG. 3.

The feature vector representation of the superpixel of the sample may be compared to the other feature vectors using any suitable metric or algorithm known in the art, such as distance metrics, clustering metrics and algorithms, and the like.

In some embodiments steps 204 to 208, namely finding a superpixel, converting it to a feature vector, and comparing the feature vector to other feature vectors, are repeated for various possible superpixel of the image. In some such embodiments, the minimum block size of a superpixel is a block size of 30×30 pixels.

Once a nearest match is found, at step 210 the system evaluates whether the matching feature vector has a name associated therewith. If a name is assigned to the matching feature vector, at step 211 the name associated with the matching feature vector is assigned to the current feature vector. For example, the name may represent a morphology or pathology which is thought to be represented in the superpixel. The name may be presented to the viewer or user at step 212, for example by processor 12 providing the suggested name to a viewer on a display 22 of a user interface 18 (FIG. 1).

At step 214, the viewer or user may provide input relating to the proposed name, which input may be a confirmation of the proposed name (indicating that based on the captured image as seen by the viewer, the name correctly represents the morphology or pathology in the superpixel), or a rejection of the proposed name.

At step 216, the viewer's input is evaluated to determine whether or not it is a confirmation of the proposed name. If the received input is a confirmation of the proposed name, at step 218 a naming counter is increased. The threshold counter represents the number of times that a morphology has been correctly named.

On the other hand, if the received input is not a confirmation of the proposed name, at step 220 the naming counter is evaluated to determine whether or not a threshold value has been reached, for example by processor 12 (FIG. 1). If the naming counter is greater than or equal to the threshold value, the name assigned to the superpixel (and to the morphology represented thereby) may not be changed, and the lack of confirmation is ignored at step 222. Otherwise, if the naming counter is smaller than the predetermined threshold, the user may be prompted to provide another name to associate with the superpixel, at step 224.

It is a particular feature of the disclosed technology that the system 10 learns suitable names for specific morphologies and pathologies, by confirmations provided by viewers to suggested names, as described hereinabove. Additionally, use of the naming counter ensures that once a specific morphology has been correctly named a sufficient number of times to show that the system has correctly learned to identify the morphology, a user may not change the name assigned to the morphology. As such, the system cannot "unlearn" what has been correctly learned, and a user, such as an inexperienced user, cannot damage or harm the functionality of the system by introducing inaccurate classifications or names.

If at step 210 it is found that the matching feature vector has no name associated therewith, at step 225 the two matching superpixels are presented to the user or viewer, for example on display 22 (FIG. 1), and the user is prompted to provide a name to be associated with the matching superpixels. The name provided by the user is stored, in association with the two matching feature vectors and superpixels, for example in data repository 14 (FIG. 1), at step 226.

In some embodiments, at step 227 the processor 12, or the density measuring component 24 (FIG. 1), determines whether a section of the image which has a high density of named morphologies. This may occur following steps 204 to 224, in which one or more superpixels of the image are identified as being associated with named morphologies.

In such embodiments, if a section with a high density of named morphologies is found, the section may be indicated to the viewer at step 228. For example, the indication may be provided by zooming in of a display of the image to the high density section, outlining the high density section, and/or color coding the high density section.

In some embodiments, when the morphology named in step 210, or the morphology name provided in step 225, is associated with a specific clinical context, or when in the high density section multiple morphology names are associated with a specific clinical context, an indication may be provided to the user that a specific type of medical specialty should be employed for a patient associated with the sample. For example, if the named morphology is associated with leukemia, an indication may be provided to the viewer that the patient from whom the sample was obtained should be referred to a hemato oncologist.

Figure 3:
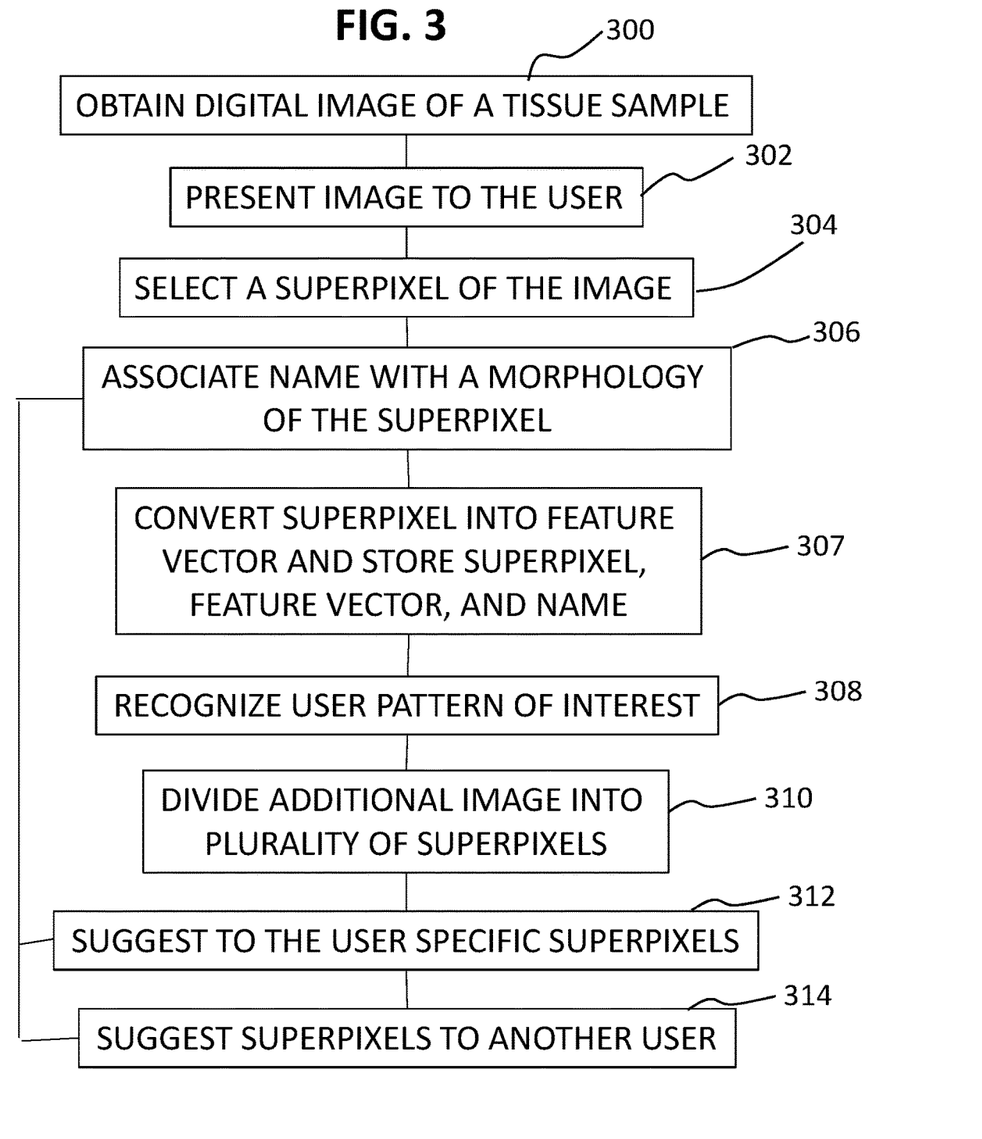
FIG. 3 shows a flow chart of a method for associating a name with a morphology in a tissue sample according to an embodiment of the disclosed technology.

FIG. 3 shows a flow chart of a method for associating a name with a morphology in a tissue sample according to an embodiment of the disclosed technology. As seen in FIG. 3, initially at step 300 a digital image of a tissue sample is obtained, the tissue sample being from a mammalian source. In some embodiments, at step 302, the digital image is presented to a user, and the user selects a superpixel of the image at step 304, and associates a name with a morphology of the superpixel at step 306. At step 307 the superpixel may be converted into a feature vector, and may be stored, together with the associated feature vector and/or name, for example in data repository 14 (FIG. 1).

In some embodiments, when a specific user or viewer carries out steps 300 to 306 multiple times with different samples, patterns of interest of the user or viewer are recognized at step 308, for example by processor 12 (FIG. 1). For example, such patterns of interest may be recognized based on any two or more of areas of the images where the user zooms, areas of the images where the user pans, and/or areas of the images where the user names regions or morphologies, or where the user selects superpixels.

In some such embodiments, when superpixels and/or morphologies need to be identified in an additional digital image, the additional digital image is automatically divided into a plurality of superpixels at step 310, for example each block of size 30×30 pixels is considered to be a superpixel of the additional digital image. At step 312, specific superpixels from the plurality of superpixels are suggested to the user for naming thereof or for implementation of the method of FIG. 2, based on the recognized patterns of interest of the user, and naming of the suggested superpixels may continue in step 306 of FIG. 3 (or in steps 208 to 228 of FIG. 2).

In some embodiments, at step 314, some of said plurality of superpixels may be provided to at least one other user for naming thereof, and at step 316 the other user may name the suggested superpixels as described with respect to step 306 FIG. 3 (or in steps 208 to 228 of FIG. 2). In some embodiments, the at least one other user is a user having a pattern of interest which overlaps with the pattern of interest of the user, or which is similar to the pattern of interest of the user. In some embodiments, the at least one other user is a user who is indicated to be, or have, the same medical specialty as the user or a similar medical specialty to the user.

For example, if the first user is a hemato-oncologist interested in morphologies representative of lymphoma, suggested superpixels may be provided to another user which is interested in morphologies representative of lymphoma and/or to other hemato oncologists.

Figure 4:
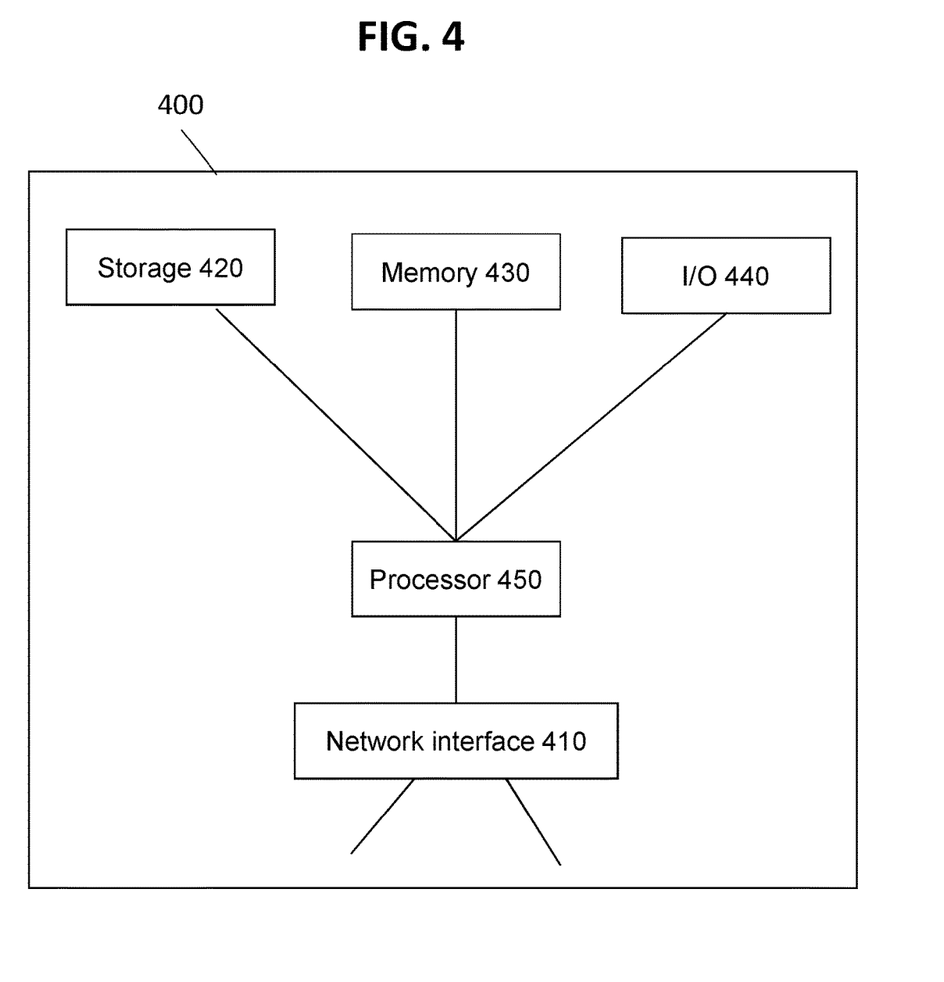
FIG. 4 shows a high-level block diagram of a device that may be used to carry out the disclosed technology.

FIG. 4 shows a high-level block diagram of a device that may be used to carry out the disclosed technology. Computing device 400 comprises a processor 450 that controls the overall operation of the device by executing the device's program instructions which define such operation. The device's program instructions may be stored in a storage device 420 (e.g., magnetic disk, database) and loaded into memory 430 when execution of the console's program instructions is desired. Thus, the device's operation will be defined by the device's program instructions stored in memory 430 and/or storage 420, and the console will be controlled by processor 450 executing the console's program instructions.

The device 400 also includes one or a plurality of input network interfaces for communicating with other devices via a network (e.g., packet-switched data network). The device 400 further includes an electrical input interface for receiving power and data from a power source. A device 400 also includes one or more output network interfaces 410 for communicating with other devices. Device 400 also includes input/output 440, representing devices which allow for user interaction with a computing device (e.g., touch display, keyboard, fingerprint reader etc.).

One skilled in the art will recognize that an implementation of an actual device will contain other components as well, and that FIG. 4 is a high level representation of some of the components of such a device for illustrative purposes. It should also be understood by one skilled in the art that the methods, systems and/or devices depicted in FIGS. 1 through 3 may be implemented on a device such as is shown in FIG. 4.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described hereinabove are also contemplated and within the scope of the disclosed technology.

The invention claimed is:

1. A method of locating morphology in a tissue sample, comprises the steps of:

obtaining a first, second, and third tissue sample, each removed from an organism;

taking a microscope to each said first, second, and third tissue sample and digitizing magnified image of said first tissue sample, said second, and said third tissue sample;

receiving a selection of at least one superpixel of said image of said first tissue sample;

receiving a named morphology for said at least one superpixel and converting said at least one superpixel into a first feature vector;

extracting superpixels of said image of said second tissue sample and converting each superpixel of said second image of said second tissue into second feature vectors;

finding, using a processor carrying out instructions, within said second feature vectors of said second tissue, a nearest match feature vector to said first feature vector; and indicating that a superpixel of said second image associated with said nearest match feature vector is possibly a representation of said named morphology;

after receiving confirmation of a name of said named morphology from a viewer for said named morphology a threshold number of minimum times, a name of said named morphology becomes unchangeable for future scanned superpixels determined to be associated with said named morphology; and wherein said third tissue sample has a third superpixel with a feature vector indicated as being a nearest match to a feature vector found in one of said first or said second tissue samples;

further wherein said third superpixel and corresponding superpixels associated with said match feature vector of said first or said second tissue sample are unnamed;

exhibiting at least one of said third superpixel and said corresponding superpixels;

requesting a name for said at least one of said third superpixel and said corresponding superpixels; and providing said name at a future time when a feature vector is found corresponding to said third superpixel.

2. The method of claim 1, further comprising steps of:
exhibiting said superpixel associated with said nearest match feature vector to a viewer; and
receiving confirmation from said viewer of said superpixel associated with said nearest match feature vector is said named morphology.

3. The method of claim 1, wherein before said threshold number of minimum times, a name of said pathology is changeable for at least some feature vectors associated with a superpixel of a morphology which was previously indicated as said named morphology.

4. The method of claim 3, wherein a superpixel comprises a minimum of block size of 30 by 30 pixels and each possible block of said second image is scanned to find a superpixel which has an associated feature vector closest to said first feature vector.

5. The method of claim 1, wherein said method is carried out multiple times with a same viewer, each time said first and second tissue sample being replaced with additional said tissue samples, further comprising the steps of:
recognizing patterns of interest by said same user based on two or more of:
areas of said images where said user zooms;
areas of said image where said user pans;
areas of said images where user names regions.

6. The method of claim 5, wherein suggestions of superpixels to view are sent to said viewer based on said patterns of interest.

7. The method of claim 6, wherein said suggestions are further made for a second viewer based on said patterns of interest overlapping for said viewer and said second viewer.

8. The method of claim 6, wherein said suggestions are further made for additional viewers based on receiving an indication that said viewer and at least one additional viewer of said additional viewers is in a same medical specialty as said viewer.

9. The method of claim 1, further comprising a step of:
determining a section of an image of said second tissue sample with a high density of named morphologies;
indicating to said viewer said high density section.

10. The method of claim 9, wherein said indicating to said viewer said high density section is carried out by way of one of:
zooming in a display of said second tissue sample to said high density section;
outlining said high density section; and
color coding said high density section.

11. The method of claim 1, wherein in second tissue sample, a plurality of additional named morphologies, including said named morphology, are determined to be related to a clinical context and indicating to said viewer that a particular type of medical specialty should be employed for a patient associated with said second tissue sample.

12. The method of claim 1, wherein said second tissue sample is being viewed by said viewer in real-time using a microscope apparatus.

13. A system for locating morphology in a tissue sample, comprising:
storage of a plurality of feature vectors, each associated with a specific named superpixel of a larger image of a tissue sample from an organism;
a microscope outputting a live image of an additional tissue sample;
a processor carrying out instructions to:
a) convert at least one superpixel of said live image into a first feature vector;
b) find a nearest match between said first feature vector and said plurality of stored feature vectors; and
c) output a first name suggestion of said at least one superpixel of said live image based on said nearest match to one of said stored plurality of feature vectors associated with said specific named superpixel;
wherein the above is carried out for at least three tissue samples each with different superpixels determined to be a nearest match to said first feature vector, said first feature vector having a name which is changeable;
requesting a name for said first feature vector while exhibiting an unnamed superpixel;
providing said name at a future time when a feature vector is found corresponding to the previously said unnamed superpixel;
wherein upon receiving a confirmation of said name suggestion for said first name a threshold number of minimum times, said first name becomes permanently associated with a particular morphology and is becomes unchangeable for future scanned superpixels determined to be associated with said named morphology.

14. The system of claim 13, further comprising an input mechanism through which a recipient of said name suggestion sends said confirmation of said name suggestion.

15. The system of claim 13, wherein said at least one superpixel is a plurality of superpixels making up said live image and suggestions as to which superpixels of said plurality of superpixels to view are indicated to said viewer based on a pattern of interest identified for said viewer.

16. The system of claim 15, wherein said pattern of interest identified for said viewer is based on overlapping selections of superpixels between said viewer and a second viewer.

17. The system of claim 13, wherein said suggestions are further made for additional viewers based on receiving an indication that said viewer and at least one additional viewer of said additional viewers is in a same medical specialty as said viewer.

18. The system of claim 13, further comprising a component measuring a density of named morphologies in an image and a component exhibiting to a user relative densities of at least one selection of part of said image.

19. The system of claim 18, wherein said device determines morphologies of greatest frequency covering a plurality of superpixels and prompts said user to name said morphologies of greatest frequency.

20. The system of claim 18, wherein said device determines regions comprising a plurality of superpixels where morphologies are unnamed and prompts said user to name said regions.

* * * * *